United States Patent
Hill et al.

(10) Patent No.: US 10,477,774 B2
(45) Date of Patent: Nov. 19, 2019

(54) WINDROW FLUFFING ROLL ASSEMBLY FOR AN AGRICULTURAL MACHINE

(71) Applicant: Deere & Company, Moline, IL (US)

(72) Inventors: Kellen B. Hill, Ottumwa, IA (US);
David V. Rotole, Bloomfield, IA (US);
Thomas A. Nichols, Eldon, IA (US)

(73) Assignee: Deere & Company, Moline, IL (US)

( * ) Notice: Subject to any disclaimer, the term of this patent is extended or adjusted under 35 U.S.C. 154(b) by 131 days.

(21) Appl. No.: 15/706,873

(22) Filed: Sep. 18, 2017

(65) Prior Publication Data

US 2018/0116122 A1     May 3, 2018

Related U.S. Application Data

(60) Provisional application No. 62/414,299, filed on Oct. 28, 2016.

(51) Int. Cl.
    *A01D 89/00* (2006.01)
    *A01D 43/10* (2006.01)

(52) U.S. Cl.
    CPC ........... *A01D 89/002* (2013.01); *A01D 43/10* (2013.01); *A01D 43/102* (2013.01); *A01D 43/105* (2013.01); *A01D 89/008* (2013.01); *A01D 89/004* (2013.01)

(58) Field of Classification Search
    CPC .... A01D 89/002; A01D 43/10; A01D 89/008; A01D 43/102; A01D 43/105; A01D 89/004; A01D 82/00; A01D 34/667; A01D 57/28; A01D 43/08
See application file for complete search history.

(56) References Cited

U.S. PATENT DOCUMENTS

| | | | |
|---|---|---|---|
| 2,908,126 A | 10/1959 | Dyrdahl | |
| 3,680,290 A | 8/1972 | Laverne | |
| 3,722,190 A * | 3/1973 | Fisher | A01D 43/102 56/1 |
| 3,722,191 A | 3/1973 | Braunberger | |
| 3,803,821 A | 4/1974 | Peacock et al. | |
| 3,881,301 A * | 5/1975 | Sawyer | A01D 43/107 56/14.4 |

(Continued)

FOREIGN PATENT DOCUMENTS

| | | |
|---|---|---|
| DE | 2653463 A1 | 1/1978 |
| DE | 19632000 A1 | 11/1997 |

(Continued)

OTHER PUBLICATIONS

European Search Search Report, dated Mar. 27, 2018, pp. 1-7.

*Primary Examiner* — Arpad Fabian-Kovacs
(74) *Attorney, Agent, or Firm* — Taft Stettinius & Hollister LLP; Stephen F. Rost

(57) ABSTRACT

A mower-conditioner assembly of a self-propelled windrower includes a frame, a cutting mechanism coupled to the frame for cutting crop, a conditioner rotatably coupled to the frame at a location rearward of the cutting mechanism, and a fluffer assembly rotatably coupled to the frame at a location rearward of the conditioner. The fluffer assembly includes at least an elongated roll and a crop moving element. The conditioner crimps the crop after it is cut, and the fluffer assembly fluffs or moves the crop during operation.

20 Claims, 8 Drawing Sheets

(56) References Cited

U.S. PATENT DOCUMENTS

| | | | |
|---|---|---|---|
| 3,977,165 A * | 8/1976 | Klinner | A01D 43/08 56/16.4 R |
| 4,099,364 A | 7/1978 | Kanengieter et al. | |
| 4,188,773 A | 2/1980 | Kaetzel | |
| 4,196,567 A * | 4/1980 | Davis | A01D 43/102 56/13.7 |
| 4,265,076 A | 5/1981 | Krutz | |
| 4,299,078 A * | 11/1981 | Werner | A01D 43/10 56/14.1 |
| 4,398,384 A | 8/1983 | Klinner | |
| 4,843,804 A * | 7/1989 | Wellman | A01D 43/107 56/16.4 C |
| 5,056,302 A * | 10/1991 | Rosenbalm | A01D 43/105 464/48 |
| 5,269,124 A * | 12/1993 | Barthel | A01D 82/00 56/16.4 B |
| 5,930,988 A * | 8/1999 | Hanson | A01D 57/00 56/16.4 A |
| 6,055,799 A | 5/2000 | Savoie et al. | |
| 6,715,274 B2 | 4/2004 | Peeters et al. | |
| 6,745,552 B2 | 6/2004 | Kraus et al. | |
| 8,006,470 B2 * | 8/2011 | Pruitt | A01D 43/10 56/16.4 A |
| 8,458,997 B2 * | 6/2013 | Walch | A01D 43/10 56/16.4 A |
| 8,925,292 B2 * | 1/2015 | Lebeau | A01D 43/107 56/16.4 A |
| 8,984,851 B2 * | 3/2015 | Pruitt | A01D 43/10 56/16.4 R |
| 2004/0079062 A1 | 4/2004 | Kraus et al. | |

FOREIGN PATENT DOCUMENTS

| | | |
|---|---|---|
| EP | 0076686 A1 | 4/1983 |
| EP | 0129007 A1 | 12/1984 |
| GB | 2089635 A | 6/1982 |
| GB | 2140664 A | 12/1984 |
| RU | 53839 U1 | 6/2006 |

\* cited by examiner

WINDROW FLUFFING ROLL ASSEMBLY FOR AN AGRICULTURAL MACHINE

RELATED APPLICATIONS

This application claims priority to U.S. patent application Ser. No. 62/414,299, filed Oct. 28, 2016, the disclosure of which is incorporated by reference in its entirety herein.

FIELD OF THE DISCLOSURE

The present disclosure relates to depositing a swath of cut crop, and in particular, to a system and method of fluffing cut crop for improving dry down time.

BACKGROUND OF THE DISCLOSURE

In the hay and forage industry, an agricultural machine such as a self-propelled windrower may be used to cut hay and forage crop for feeding livestock. During operation, the crop is cut and then may be conditioned where it is crimped (i.e., the plant stem may be broken open to release moisture). It is desirable to reduce an amount of time it takes for hay or other crop to dry down, i.e., to dry or reduce moisture from the plant or crop. A faster dry down time can result in less time between cutting and baling the crop, which can further minimize risk to the crop while sitting in the field.

One example of reducing dry down time is to spread the crop as wide as possible to maximize the exposure of the crop to the sun, wind, and surrounding environment. In doing so, moisture from the crop can evaporate quicker. A limitation to this approach, however, occurs when a mowing assembly (e.g., rotary platform, a mower conditioner, a disc mower, etc.) is used to cut the crop. This is particularly true if the windrow or swath of cut crop is too wide such that a tractor wheel runs over a portion of the crop. If the crop is run over by the wheel, the crop can be packed down and thus its dry down time can be much longer.

SUMMARY

In one embodiment of the present disclosure, a mower-conditioner assembly of a self-propelled windrower includes a frame; a cutting mechanism coupled to the frame and configured to cut crop; a conditioner rotatably coupled to the frame at a location rearward of the cutting mechanism, the conditioner configured to crimp the crop; and a fluffer assembly rotatably coupled to the frame at a location rearward of the conditioner, the fluffer assembly including at least an elongated roll and a crop moving element; wherein, crop is projected from the conditioner to the fluffer assembly and directed to the ground; further wherein, the fluffer assembly configured to fluff the crop.

In one example of this embodiment, the fluffer assembly includes an impeller with a plurality of tines projecting from the elongated roll. In a second example, the elongated roll comprises a rough outer surface. In a third example, the crop moving element includes a plurality of brushes projecting from the elongated roll. In a fourth example of this embodiment, the crop moving element is pivotably coupled to the elongated roll.

In a fifth example, a fluffing roll hood may be positioned above the fluffer assembly, wherein crop is projected from the conditioner and passes through a gap defined between the fluffer assembly and hood. In a sixth example, a deflector is pivotally coupled to the frame for directing the flow of crop from the fluffer assembly in a forward direction, a rearward direction, or a downward direction. In another example, the deflector partially surrounds the fluffer assembly to direct the flow of crop in a forward and downward direction. In a further example, a shield directs the flow of crop in a rearward direction to form a windrow arrangement on an underlying surface.

In another embodiment of the present disclosure, an agricultural machine, includes a windrower including a main frame, a front axle, and a first set of wheels coupled to the front axle; a mower-conditioner assembly coupled to a front end of the windrower, the mower-conditioner assembly including a frame and a cutting mechanism coupled to the frame for cutting crop; a conditioner rotatably coupled to the frame at a location rearward of the cutting mechanism, the conditioner configured to crimp the crop; and a fluffer assembly rotatably coupled to the frame at a location rearward of the conditioner, the fluffer assembly including at least an elongated roll and a crop moving element configured to move the crop.

In one example of this embodiment, the fluffer assembly is rotatably coupled to the frame at a location near the front axle; and crop projected by the crop moving element falls on an underlying surface at a location rearward of the first set of wheels. In a second example, a first auger located between the cutting mechanism and the conditioner; and a second auger located between the conditioner and the fluffer assembly. In a third example, the fluffer assembly is rotatably coupled to the frame at a location forward of the front axle.

In a fourth example of this embodiment, the fluffer assembly includes an impeller with a plurality of tines projecting from the elongated roll or a plurality of brushes projecting from the elongated roll. In a fifth example, the elongated roll includes a rough outer surface. In a sixth example, a fluffing roll hood is positioned above the fluffer assembly, wherein crop is projected from the conditioner and passes through a gap defined between the fluffer assembly and hood. In another example, a deflector is pivotally coupled to the frame for directing the flow of crop from the fluffer assembly in a forward direction, a rearward direction, or a downward direction. In a further example, the deflector partially surrounds the fluffer assembly to direct the flow of crop in a forward and downward direction. In yet a further example, a shield directs the flow of crop in a rearward direction to form a windrow arrangement on an underlying surface.

In a further embodiment of the present disclosure, a method of fluffing crop during a mowing operation includes providing a windrower including a cutting mechanism, a conditioner, a fluffer assembly, a deflector and a shield, the fluffer assembly including at least a fluffer roll and crop moving element; travelling in a forward direction along an underlying surface and cutting crop with the cutting mechanism; crimping the crop with the conditioner after the cutting step; projecting the crop from the conditioner to the fluffer assembly;

rotatably driving the fluffer assembly; moving the crop with the crop moving element as the fluffer assembly is rotatably driven; directing the crop in a crop flow direction with the shield; distributing the crop on the underlying surface to form a windrow arrangement; and fluffing the crop during the moving step, distributing step, or both.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Figure 1:
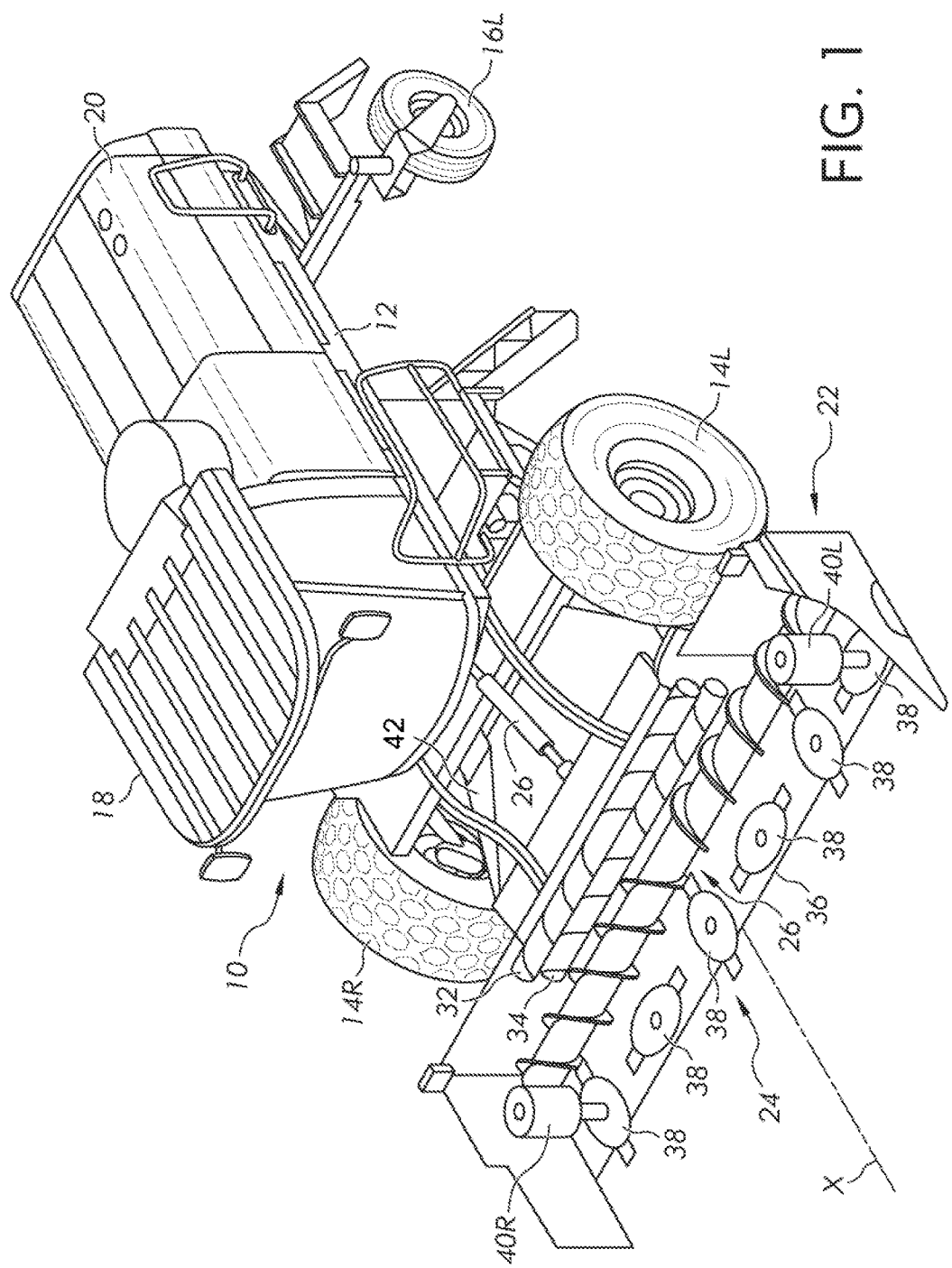
FIG. 1 is a side front perspective view of a self-propelled mower-conditioner assembly.

Referring to FIG. 1, a conventional self-propelled mower-conditioner 10 is operable to mow and collect standing crop in a field, condition the cut crop as it moves through the machine to improve its drying characteristics, and then return the conditioned material to the field in a windrow or swath. The windrower 10 includes a main frame 12 supported on driven right and left front wheels 14R and 14L, respectively and on right and left caster mounted rear wheels, of which only a left rear wheel 16L is shown. Carried on a forward end region of the frame 12 is a cab 18. Mounted on the frame 12 behind the cab 18 is a housing 20 within which is located a power source (not shown) such as an internal combustion engine. A harvesting header 22 is coupled, in a well-known manner, so as to be supported by the forward end of the frame 12. Operator controls (not shown) are provided in the cab 18 for operation of the mower-conditioner 10, including the attached harvesting header 22.

The harvesting header 22 could take many configurations but is here shown as including a rotary disc cutter bar 24 that delivers cut crop to a following crop converging auger 26 that delivers crop rearward into a discharge passage for further processing by a crop conditioning arrangement including upper and lower crop conditioner rolls 32 and 34, respectively. Conditioned crop is expelled to the rear by the conditioner rolls 32 and 34 and is formed into a windrow by upright right and left, windrow forming panels (not shown) which are supported by a top wall of an open-bottomed housing 42 located between the front wheels 14R and 14L.

The rotary disc cutter bar 24 includes an elongate gear housing 36 supporting a plurality of cutter discs 38 for rotation, with gearing (not shown) located within the housing 36 being arranged in a manner well known in the art so that the cutter discs 38 located rightward a longitudinal center line X are driven counterclockwise by a hydraulic fluid motor 40R coupled to the rightmost cutter disc 38, while the cutter discs 38 located leftward of the center line X are driven clockwise by a hydraulic fluid motor 40L coupled to the leftmost cutter disc 38. This is described herein as one embodiment, and it will be appreciated that other embodiments of disc rotation may be different. The control and other aspects of the conventional windrower 10 are further described in U.S. Pat. No. 9,179,600 to Deere and Company, which is incorporated by reference in its entirety herein.

Figure 2:
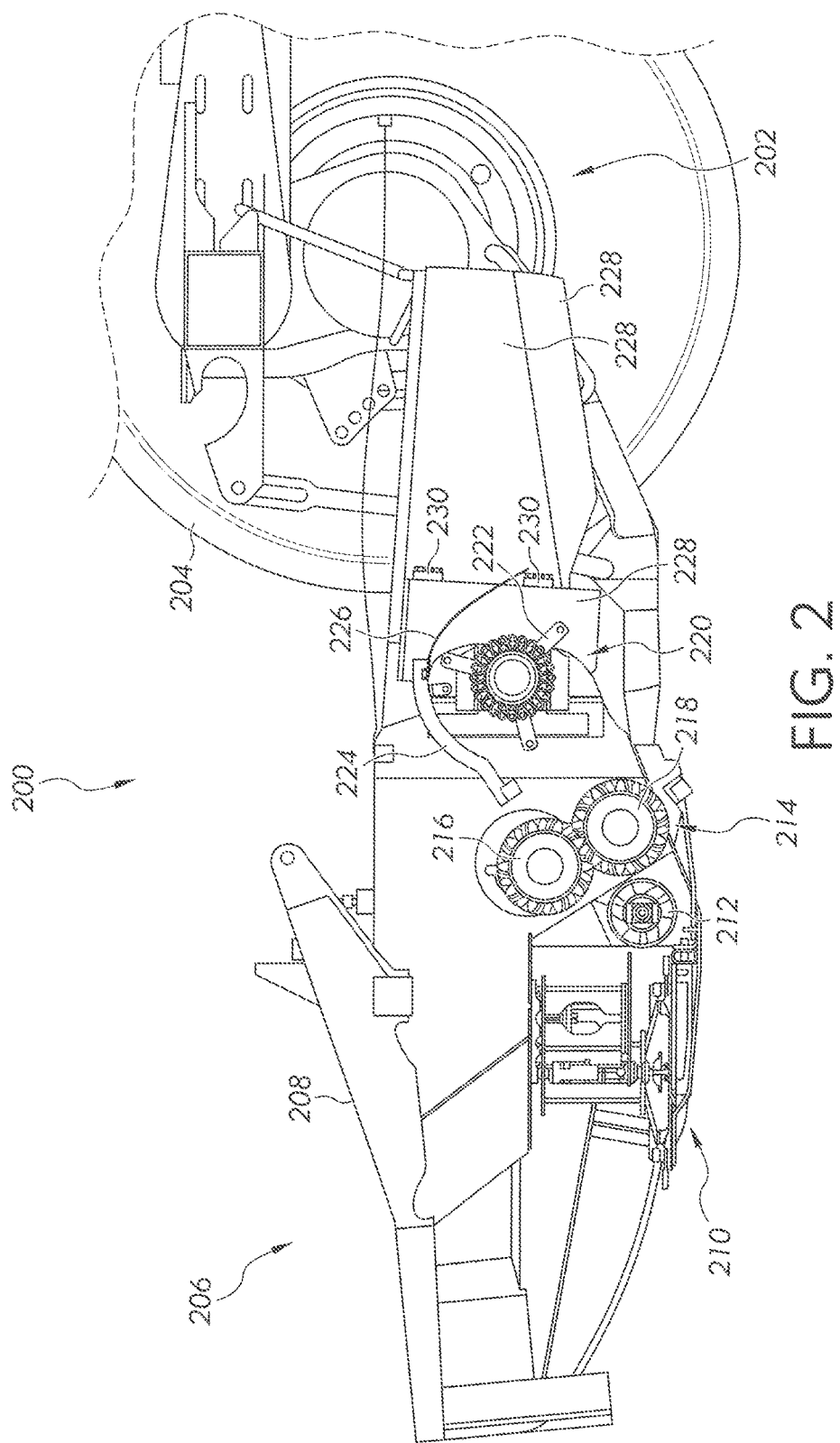
FIG. 2 is a partial side schematic view of a mower-conditioner assembly and a fluffer roll assembly.

In a different embodiment of the present disclosure, an agricultural machine such as a self-propelled windrower, mower-conditioner, or other hay mowing machine may be used to further "fluff" the crop after it is cut and conditioned to improve its dry down time. It is desirable to "fluff" the crop or provide a "fluffy" windrow to promote airflow through the crop to remove moisture and allow for additional sun exposure to penetrate the inside of the windrow to enhance the crop drying time. In this embodiment, an additional roller may be incorporated to fluff the crop. An example of this is shown in FIG. 2. Here, a partial schematic of a self propelled windrower 200 is shown with some features that are similarly shown in FIG. 1. The windrower 200 may include a front axle 202 to which a pair of front wheels 204 (only one is shown) may be rotatably mounted. The front axle 202, however, may include two hydraulically drive assemblies. In a different embodiment, a conditioner may be optional and is not required. The machine may include a fluffer assembly without a conditioner.

A mower-conditioner assembly or rotary platform 206 may be coupled to the front or forward end of the windrower 200 as shown, and during operation, the platform 206 is pushed by the windrower mowing the crop. The platform 206 may include a frame 208 to which a cutter bar 210 is coupled. The cutter bar 210 may be any conventional cutter bar with rotary discs or knives for cutting the crop. An auger 212 may be rearward of the cutter bar 210. The auger 212 may peel or otherwise help remove crop from the cutter bar 210 and move the crop to a conditioner assembly 214. In the illustrated embodiment, the conditioner assembly 214 may include a pair of rolls 216, 218 for conditioning the crop. In another embodiment, the conditioner assembly 214 may include an impeller with a plurality of tines and a conditioner hood. Other conditioner assemblies may be used, and this disclosure is not limited to any type of conditioner assembly. In the embodiment of FIG. 2, the two rolls 216, 218 may be rotatably driven such that crop passes therebetween and is crimped by the rolls as it exits the conditioner assembly 214.

Once the crop is crimped by the conditioner assembly 214, it is flung or thrown rearwardly toward a fluffing assembly 220. The fluffing assembly 220 may include a roll with a plurality of tines 222 similar to an impeller. The roll may be rotatably driven to catch the crop as it exits the conditioner assembly 214, and then further moves the crop rearward toward the front axle 202. The crop may be partially pinched or compressed between the fluffing assembly 220 and a fluffing roll hood 224 as shown in FIG. 2. Moreover, a deflector 226 may be disposed rearward of the hood 224 for directing the crop flow further rearward. The angle or position of the deflector 226 may be operably adjusted by the operator of the windrower. The crop may be thrown rearward and further directed by one or more shields 228, as shown in FIG. 2. The shields 228 may be pivotally coupled to the frame 208 via hinges 230 so that the angle at which the shields 228 are oriented may be adjustable.

The fluffing action may take place as the crop contacts the ground, which may partially be attributable to a rotational speed of the fluffing assembly 220. In one example, the "fluffed" crop may have a height on the ground of several inches greater than crop that is not subject to the fluffing action.

The fluffing assembly 220 may be rotatably driven by any known drive mechanism including chain drive, belt drive, mechanical drive, hydraulic drive, electric drive, or a combination thereof. The fluffing assembly 220 may be rotatably driven at a speed that is different from the conditioner assembly 214. Alternatively, the two assemblies may be rotatably driven at about the same speed.

Figure 3:
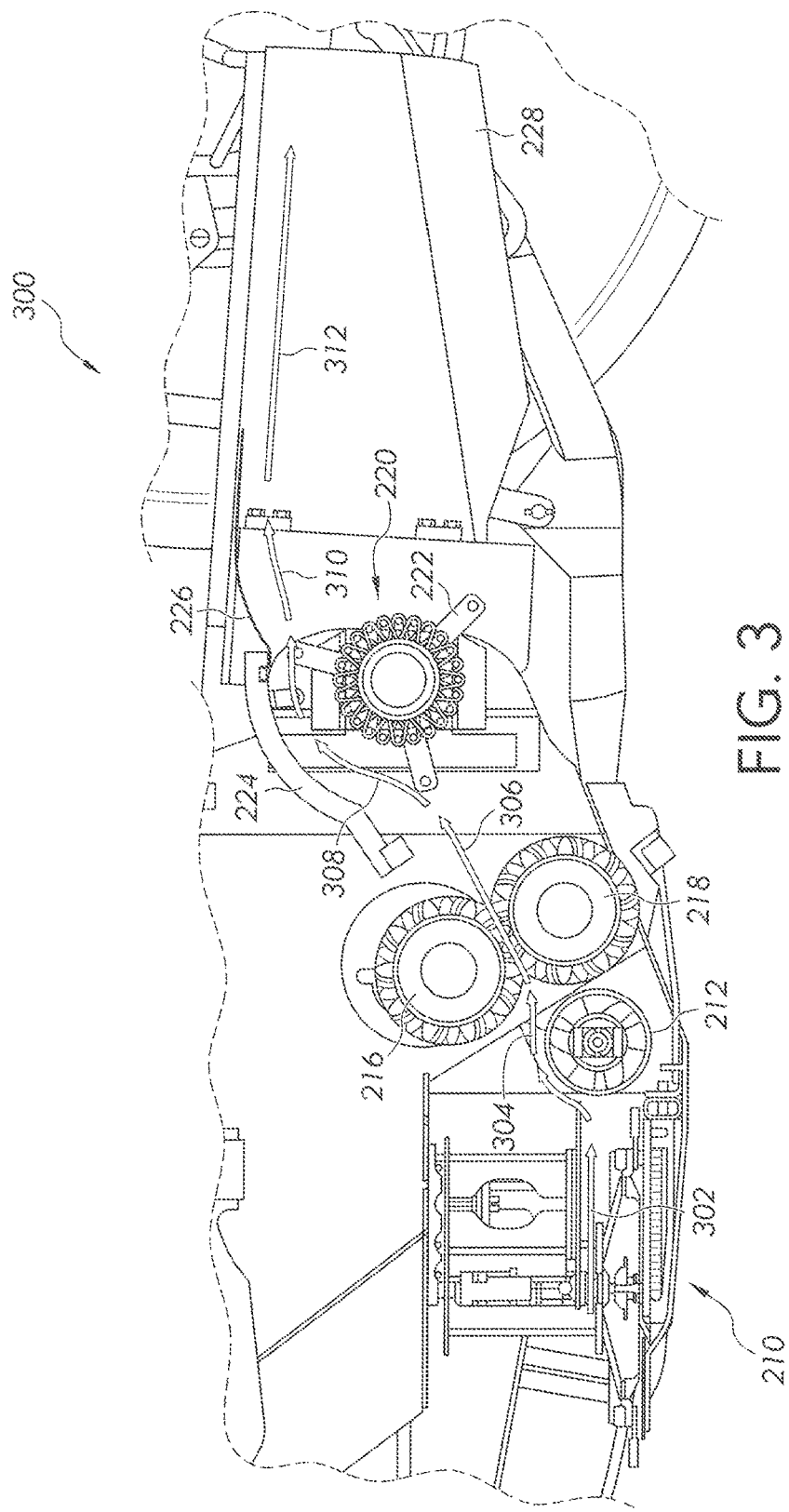
FIG. 3 is a partial side schematic view of a mower-conditioner assembly and a fluffer roll assembly for a rear throw.

The fluffing rolls of the fluffing assembly may take a variety of shapes and sizes. In some instances, the design of the roll may depend on whether the crop is thrown rearward or forward by the fluffing assembly. In FIG. 3, for example, the fluffing assembly 220 may be designed for throwing or moving the crop rearward toward the front axle 202 of the machine. In this manner, a rearward flow path 300 of the crop is shown. In a first portion 302 of the flow path 300, the crop is cut by the cutter bar 210 and is picked up by the auger 212. As the auger 212 rotates, the crop may be moved rearward along a second portion 304 of the path 300 by the auger 212 to the conditioning assembly 214. Here, the crop passes between the two rolls 216, 218 and is crimped. As it exits the rolls, the crop moves along a third section 306 of the path toward the fluffing assembly 220. As it does, a tine 222 or other crop moving element contacts the crop and moves it along a third section 308 of the path 300.

As the crop moves along the third section 308, it may contact the hood 224. The fluffing assembly 220 may further move the crop rearward and throws it in the rearward direction along a fourth section 310 of the path 300. Here, the crop may engage or be directed by the deflector 226. In this embodiment, the deflector 226 is oriented in an upper position so that the crop is moved rearward in a substantially longitudinal direction toward the front axle 202. As it does so, the crop moves rearward along a fifth section 312 of the flow path 300 and may be further directed by the shielding 228 until a windrow is left on the ground.

In the embodiment of FIG. 3, the fluffer roll or assembly 220 can execute a fluffing action to further fluff the crop. The roll, however, may not perform any conditioning function, as this is done by the conditioning assembly 214. In other embodiments, it may be possible for the fluffing roll to have a design or characteristics to carry out further conditioning or crimping of the crop.

Figure 4:
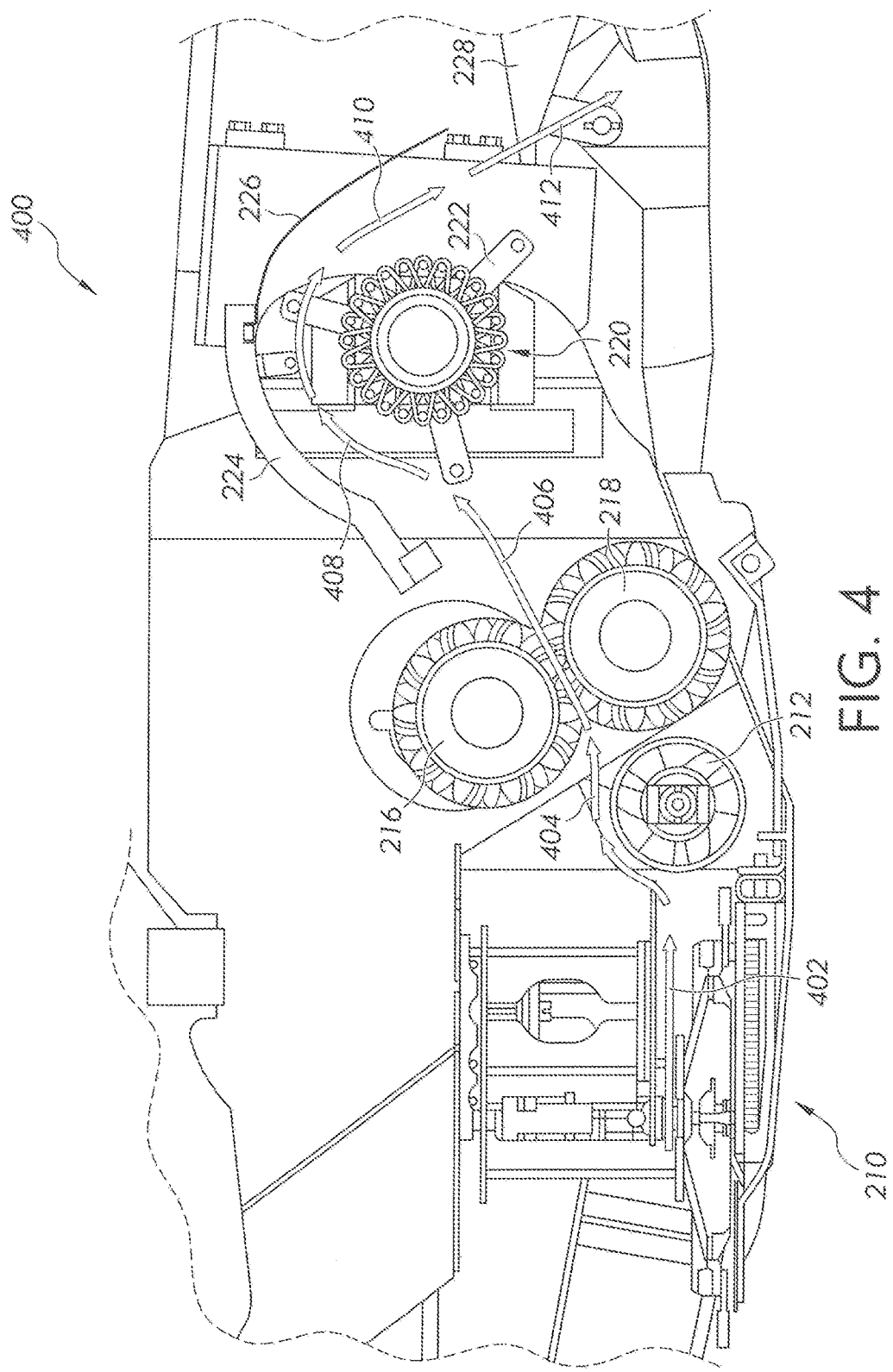
FIG. 4 is a partial side schematic view of a mower-conditioner assembly and a fluffer roll assembly for a rear and downward throw.

Referring to FIG. 4, a different embodiment of a rearward crop flow path 400 is shown. In a first portion 402 of the flow path 400, the crop is cut by the cutter bar 210 and is picked up by the auger 212. As the auger 212 rotates, the crop may be moved rearward along a second portion 404 of the path 400 by the auger 212 to the conditioning assembly 214. Here, the crop passes between the two rolls 216, 218 and is crimped. As it exits the rolls, the crop moves along a third section 406 of the path toward the fluffing assembly 220. As it does, a tine 222 or other crop moving element contacts the crop and moves it along a third section 408 of the path 400.

As the crop moves along the third section 408, it may contact the hood 224. The fluffing assembly 220 may further move the crop rearward and throws it in the rearward direction along a fourth section 410 of the path 400. Here, the crop may engage or be directed by the deflector 226. In this embodiment, and unlike the embodiment of FIG. 3, the deflector 226 is oriented in a lowered position so that the crop is moved rearward and in a downward direction toward the ground or underlying surface. As it does so, the crop moves rearward along a fifth section 412 of the flow path 400 and may be further directed by the shielding 228 until a windrow is left on the ground.

As shown, the direction in which crop is directed may be adjustably controlled by the orientation of the deflector 226. The deflector 226 may be coupled to the hood 224 and the frame 208 of the machine 200. In one embodiment, the operator may be able to adjust the orientation of the deflector 226 via controls located in the cab.

As noted above, the fluffer roll may take various forms. For example, the fluffer roll may include brushes like a street sweeper, an impeller with tines, a tube with teeth that pivot relative thereto, a helical rib, etc. The roll may be constructed so that crop does not easily wrap around a tine, rib, brush, or other crop moving element. The crop moving element may also be designed so that upon contact with the crop, it does not damage the crop or any nutrients or protein contained in the crop. Moreover, the crop moving elements disposed on the roll may be coupled thereto at various locations so that the crop can be evenly distributed along the ground or underlying surface. This distribution allows for the sun, wind, and surrounding environment to more easily remove moisture from the plant and decrease its dry down time.

Figure 8:
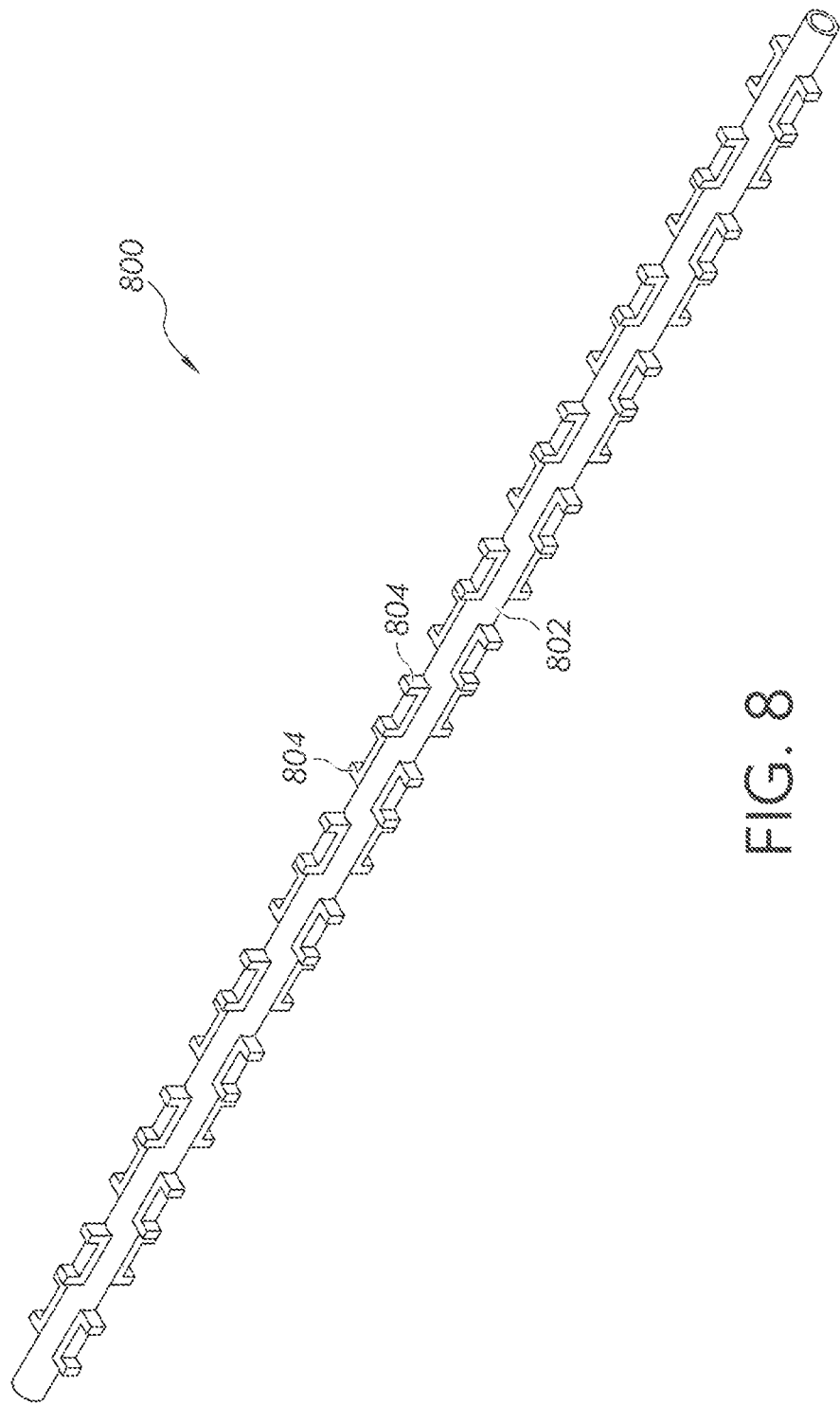
FIG. 8 is a side perspective view of a third embodiment of a fluffer roll.

In another example, the fluffer roll may be formed by an elongate tube or shaft with one or more bars pivotally coupled thereto. The bars may function like an impeller with tines. In a further example, a steel roll may be formed with a vertically-disposed rib designed in a helical pattern along an outer surface of the roll. Other designs are also possible as shown in FIGS. 5, 6, and 8.

Figure 5:
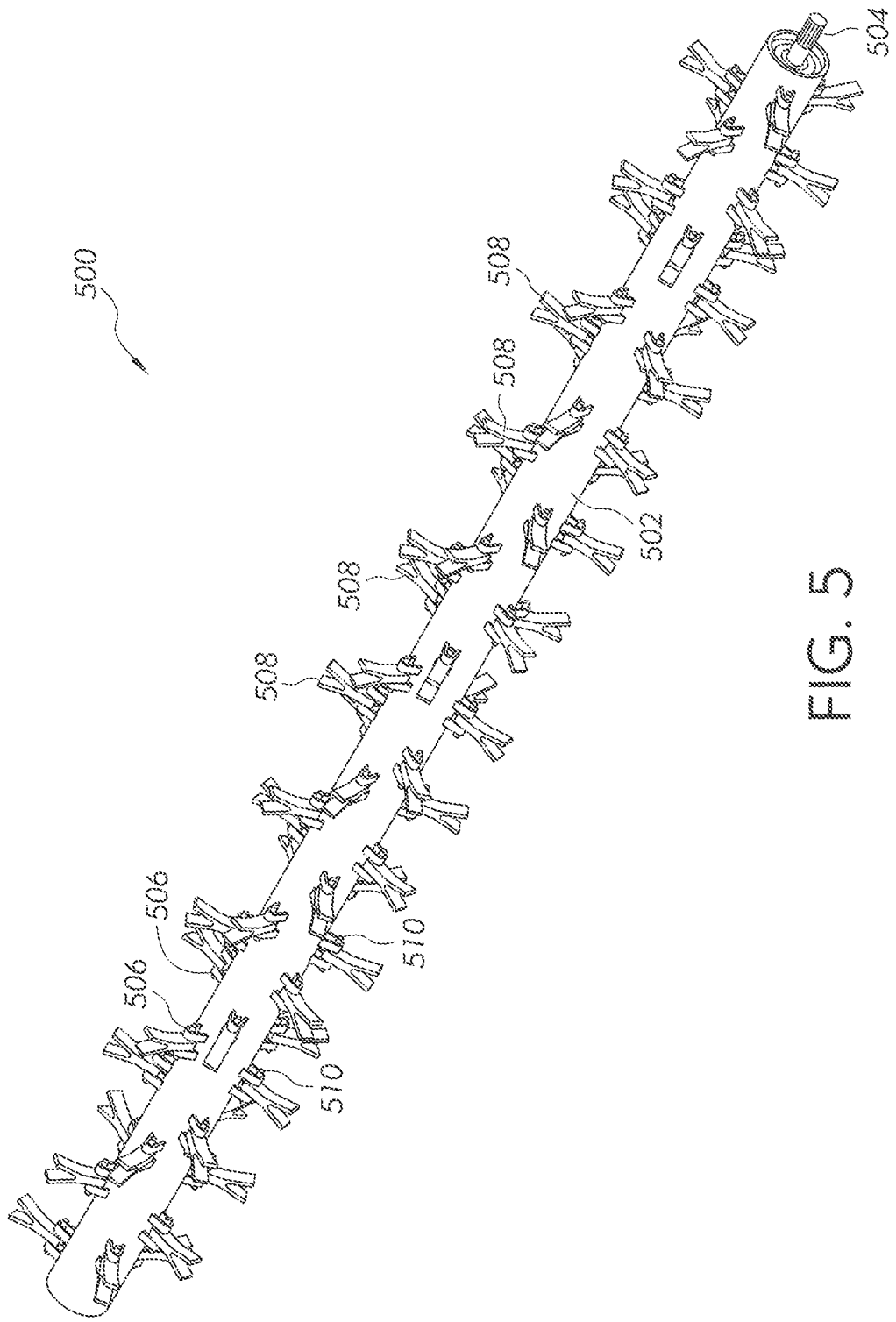
FIG. 5 is a side perspective view of a first embodiment of a fluffer roll.

In FIG. 5, for example, an impeller-shaped fluffer roll 500 is shown. The roll 500 includes an elongated tube 502 formed of any a steel or other metal, rubber, urethane, etc. In at least one embodiment, the tube 502 may be formed of a material similar to that of the conditioner rolls. In order to rotate the fluffer roll 500, a drive shaft 504 may be disposed internal of the tube 502. A chain, belt, gear or other device may rotatably drive the fluffer roll 500. A hydraulic motor, for example, may operably drive the roll 500.

The fluffer roll 500 may also include a plurality of pivot arms 506 disposed on an outer surface of the tube 502. The pivot arms 506 may be disposed in rows or columns about the outer surface. In another example, each pivot arm 506 may be angularly disposed relative to an adjacent arm. A pivot shaft 510 may be coupled to each pivot arm 506, and a tine or crop moving element 508 may be pivotably coupled to each pivot arm 506 via the pivot shaft 510.

Figure 6:
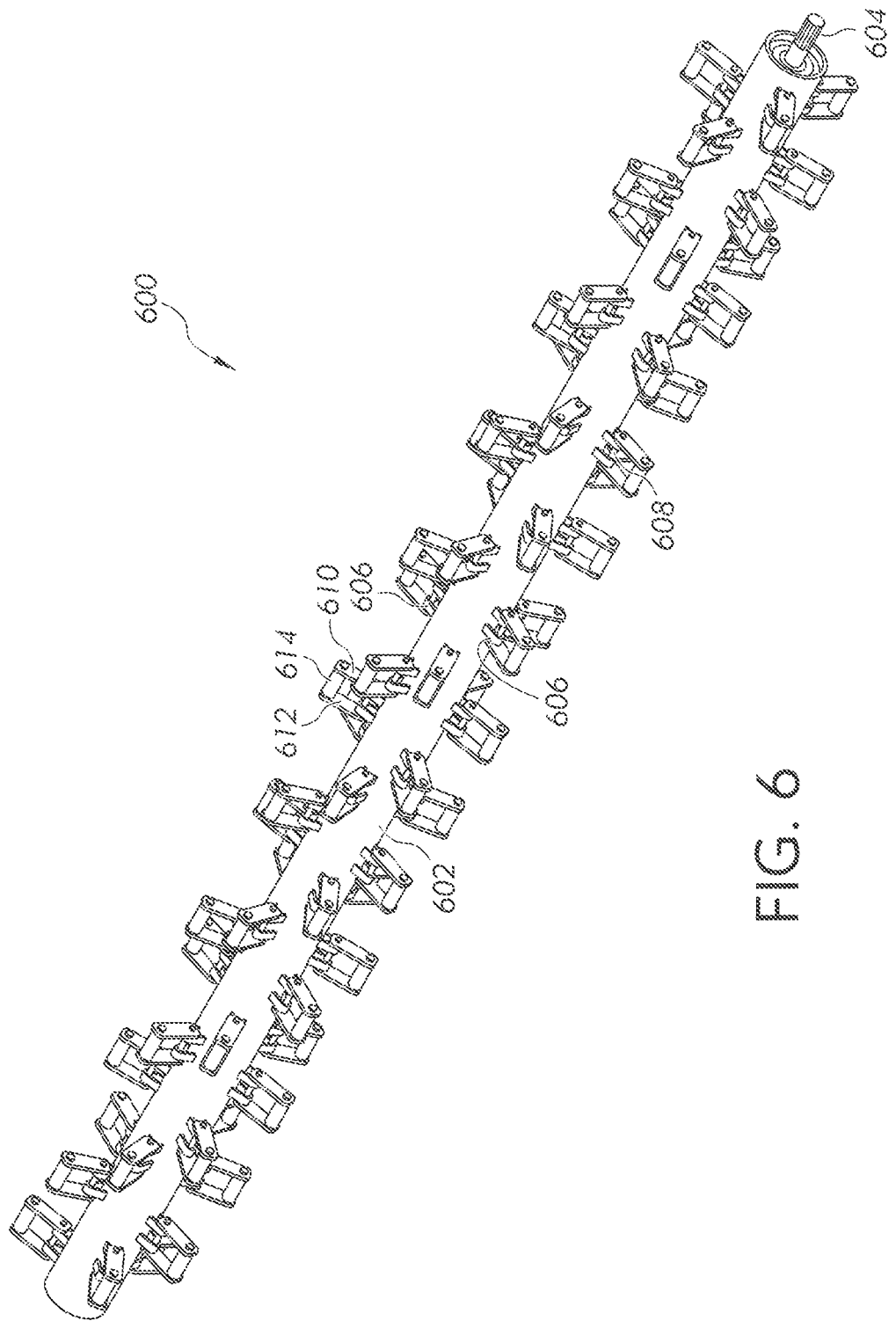
FIG. 6 is a side perspective view of a second embodiment of a fluffer roll.

Referring to FIG. 6, a different impeller-type fluffer roll 600 is illustrated. The fluffer roll 600 may include an elongate tube or shaft 602 that may be rotatably driven via a drive shaft 604. Similar to FIG. 5, the roll 600 may be driven mechanically (e.g., gear, chain, belt, etc.), electrically, hydraulically, or a combination thereof. The roll may include a plurality of pivot member 606 coupled to or integrally formed with the tube 602. Each pivot member 606 may include a pivot shaft 608. A crop moving element may be pivotably coupled to each pivot member 606 via the pivot shaft 608.

Each crop moving element may be formed by a first arm 610 and a second arm 612. One end of each arm may be pivotably coupled to the pivot shaft. The opposite end of each arm may be coupled to a bar 614. The bar 614 may be cylindrical, rectangular, or any other known shape. In this embodiment, the crop moving element can pivot with respect to the tube 602, and the weight of the bar 614 allows the crop moving element to extend in a perpendicular direction relative to the tube 602.

Figure 7:
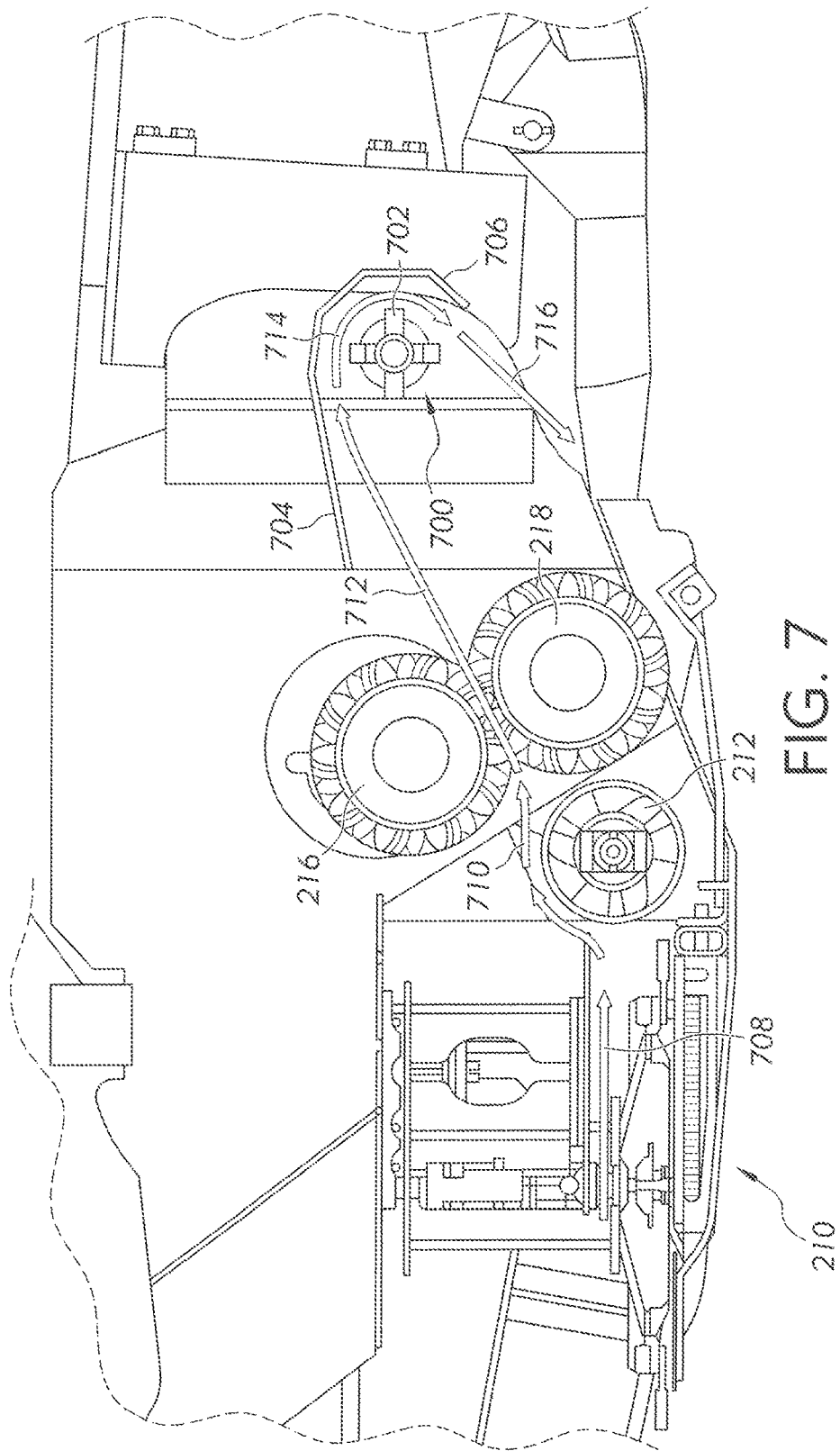
FIG. 7 is a partial side schematic view of a mower-conditioner assembly and a fluffer roll assembly or a forward throw.

In the aforementioned embodiments, the fluffer roll and fluffer assembly have been illustrated and described for a rearward projection of the crop during operation. In a different embodiment, however, the fluffer assembly and fluffer roll may be constructed for a forward projection of the crop. An example of this is shown in FIGS. 7 and 8. In FIG. 7, a fluffer assembly 700 may be rotatably driven about an axis in a clockwise direction. The fluffer assembly 700 may include a roll with one or more brush or crop moving elements 702 extending outwardly therefrom. This may take a form similar to a conventional street sweeper or lawn sweeper. Alternatively, it may also take the form of a broom-like design. The brush or crop moving elements may be shorter than the tines 222 shown in FIG. 2. One reason for the shorter length is because the fluffer assembly 700 is designed for moving the crop, and not necessarily carrying out a fluffing action. The fluffing action occurs more when the crop contacts the ground at a certain speed.

In some embodiments, the fluffer assembly may only be a roll without any crop moving elements. In this embodiment, the roll may include a rough outer surface used to move the crop. In any event, the fluffer assembly 700 is structured more for moving the crop along a flow path as shown in FIG. 7, rather than fluffing the crop.

The crop flow path in FIG. 7 may be defined by a plurality of sections or portions. In a first section 708 of the flow path, the crop is cut by the cutter bar 210 and moves rearward toward the auger 212. In turn, the auger 212 rotates so that the crop is moved from the cutter bar 210. The auger 212 can move the crop along a second section 710 of the flow path and in a direction towards the conditioner rolls 216, 218. The crop passes between the conditioner rolls 216, 218 and is crimped. As the crop is crimped, it is projected along a third section 712 of the flow path towards the fluffer assembly 700.

The clockwise rotation of the fluffer assembly 700 can move the crop between the flutter assembly 700 and a first portion 704 of a deflector. This portion of the deflector may be partially inclined so that the crop can travel around the fluffer assembly 700. The deflector may include a second section 706 that includes a decline toward the ground and in a forward direction. As shown, the deflector substantially surrounds the fluffer assembly 700 over 180° of the fluffer roll. Thus, the crop may travel 180° or more as is projected in a rearward direction along the third section 712 of the flow path, but is then redirected by the deflector along a fourth section 714 and fifth section 716 in a forward and downward direction. As the crop travels along the fifth section 716 of the flow path, it contacts the ground at a speed that promotes fluffing upon contact.

Referring to FIG. 8, an example of a fluffer roll 800 is shown that may be used for a forward projection of the crop similar to that shown in FIG. 7. Here, the fluffer roll 800 may be formed of steel or other suitable metal, or rubber or other desired material. Since the function of the fluffer roll is more to move the crop compared to the impeller rolls of FIGS. 5 and 6, it is structured to be less aggressive upon contact with the crop. The fluffer roll 800 may include an elongated tube 802 that is rotatably driven according to any known means. A plurality of crop moving elements 804 may be coupled to or integrally formed with the tube 802. In the illustrated embodiment of FIG. 8, the crop moving elements 804 form a C-shaped member. This, however, is not intended to be limiting. These elements may be brushes or short members that protrude outwardly from the tube 802. As described above, the tube 802 may be formed without any crop moving elements in one embodiment. Instead, the outer surface of the tube 802 may be roughened to promote crop movement. Thus, FIG. 8 is only one of many types of rolls and crop moving elements that may be used for a forward crop projecting system.

As shown in the illustrated embodiments, the fluffer assembly is located rearwardly of the mower (e.g., cutter bar 210) and conditioning assembly 214. The distance between the conditioning assembly 214 and fluffer assembly, however, can vary. In one example, the distance may be defined by the rotational speed, or difference therebetween, of the conditioning assembly and fluffer assembly. In addition, the type of shielding used may also impact the distance between the two assemblies. If the two assemblies are too close, there is a risk that the crop may get plugged or damaged therebetween. If the distance is too great, the crop can lose velocity as it is projected from the conditioning assembly to the fluffer assembly, and gravity can tend to pull the crop downwardly toward the ground and therefore entirely bypass the fluffer assembly. Thus, the distance may be desirably set such that the fluffer assembly is spaced from the conditioning assembly so that most or all of the crop from the conditioning assembly is received by the fluffer assembly without causing a plug. Moreover, the fluffer assembly may be located immediately behind the pair of rolls 216, 218, behind the rear tires, or at any location therebetween.

In one embodiment, it is desired to position the fluffer assembly as far forward as possible toward the conditioning assembly as this can reduce the weight of the forward portion of the windrower. It can also impact the width of the windrow that is distributed on the ground. The front axle of the windrower is often the heaviest end thereof, and it can also be the most rigid. Thus, a more forward positioned fluffer assembly can provide a better distribution of weight of the windrower.

In another example, however, it may be desirable to position the fluffer assembly as close to the front axle as possible so that the windrow may be distributed on the ground behind the front wheels. This reduces or eliminates the chance that the front wheels contact the windrow. In this embodiment, a second auger or outwardly projecting device may be incorporated between the conditioning assembly and fluffer assembly to ensure most or all of the crop is received by the fluffer assembly. In addition to spreading the crop behind the front wheels in this embodiment, the overall width of the windrow may be greater when the fluffer assembly is disposed in close proximity to the front axle of the windrower. The resulting windrow is capable of being very narrow or as wide as the machine's cut width, or at any width therebetween.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A mower-conditioner assembly of a self-propelled windrower, comprising:
   a frame;

a cutting mechanism coupled to the frame and configured to cut crop;

a conditioner rotatably coupled to the frame at a location rearward of the cutting mechanism, the conditioner configured to crimp the crop;

a fluffer assembly rotatably coupled to the frame at a location rearward of the conditioner, the fluffer assembly including at least an elongated roll and a crop moving element;

a hood positioned partially around the fluffer assembly; and a deflector pivotally coupled to the hood and positioned partially around the fluffer assembly;

wherein, an angle of the deflector relative to the hood is adjustable;

wherein, crop is projected from the conditioner to the fluffer assembly and directed to the ground through the hood and deflector;

further wherein, the fluffer assembly configured to fluff the crop.

2. The mower-conditioner assembly of claim 1, wherein the fluffer assembly comprises an impeller with a plurality of tines projecting from the elongated roll.

3. The mower-conditioner assembly of claim 1, wherein the elongated roll comprises a rough outer surface.

4. The mower-conditioner assembly of claim 1, wherein the crop moving element is pivotably coupled to the elongated roll with a pivot shaft.

5. The mower-conditioner assembly of claim 1, further wherein the hood is positioned above the fluffer assembly and crop is projected from the conditioner and passes through a gap defined between the fluffer assembly and the hood.

6. The mower-conditioner assembly of claim 1, further wherein the deflector directs the flow of crop from the fluffer assembly in a forward direction, a rearward direction, or a downward direction.

7. The mower-conditioner assembly of claim 6, wherein the fluffer assembly has an entry section of crop flow and an exit section of crop flow and the deflector partially surrounds the fluffer assembly to direct the flow of crop about 180 degrees between the entry section and exit section or crop flow in a forward and downward direction.

8. The mower-conditioner assembly of claim 1, further comprising a shield pivotally coupled to the frame with a hinge to have an adjustable angle between the shield and the frame for selectively directing the flow of crop in a rearward direction to form a windrow arrangement on an underlying surface.

9. The mower-conditioner assembly of claim 1, further comprising a second section of the deflector that includes a decline toward the ground in a forward direction.

10. An agricultural machine, comprising:
a windrower including a main frame, a front axle, and a first set of wheels coupled to the front axle;
a mower-conditioner assembly coupled to a front end of the windrower, the mower-conditioner assembly including a frame and a cutting mechanism coupled to the frame for cutting crop;
a conditioner rotatably coupled to the frame at a location rearward of the cutting mechanism, the conditioner configured to crimp the crop; and
a fluffer assembly rotatably coupled to the frame at a location rearward of the conditioner, the fluffer assembly including at least an elongated roll and a crop moving element configured to move the crop;

wherein, the fluffer assembly is rotatably driven at a speed that is different from the conditioner.

11. The agricultural machine of claim 10, wherein:
the fluffer assembly is rotatably coupled to the frame at a location near the front axle; and
crop projected by the crop moving element falls on an underlying surface at a location rearward of the first set of wheels.

12. The agricultural machine of claim 10, wherein the fluffer assembly is rotatably coupled to the frame at a location forward of the front axle.

13. The agricultural machine of claim 10, wherein the fluffer assembly comprises an impeller with a plurality of tines projecting from the elongated roll or a plurality of brushes projecting from the elongated roll.

14. The agricultural machine of claim 10, wherein the elongated roll comprises a rough outer surface.

15. The agricultural machine of claim 10, further comprising a fluffing roll hood positioned above the fluffer assembly and a deflector pivotally coupled to the fluffing roll hood, wherein crop is projected from the conditioner and passes through a gap defined between the fluffer assembly and the fluffing roll hood before encountering the deflector.

16. The agricultural machine of claim 10, further comprising a deflector pivotally coupled to the frame for directing the flow of crop from the fluffer assembly in a forward direction.

17. The agricultural machine of claim 16, wherein the deflector partially surrounds the fluffer assembly to direct the flow of crop to exit the deflector in a flow path oriented in the forward direction.

18. The agricultural machine of claim 10, further comprising a shield for directing the flow of crop in a rearward direction to form a windrow arrangement on an underlying surface.

19. The agricultural machine of claim 15, further comprising a second section of the deflector that includes a decline toward the ground in a forward direction.

20. A method of fluffing crop during a mowing operation, comprising:
providing a windrower including a cutting mechanism, a conditioner, a fluffer assembly, a hood, a deflector, and a shield, the fluffer assembly including at least a fluffer roll and crop moving element;
selecting an angle of the deflector relative to the hood to reduce dry down time of cut crop;
travelling in a forward direction along an underlying surface and cutting crop with the cutting mechanism;
crimping the crop with the conditioner after the cutting step;
projecting the crop from the conditioner to the fluffer assembly;
rotatably driving the fluffer assembly at a different speed than the conditioner;
moving the crop with the crop moving element as the fluffer assembly is rotatably driven;
directing the crop with the hood as the crop enters the fluffer assembly and directing the crop with the deflector as the crop exits the fluffer assembly;
directing the crop in a crop flow direction with the shield;
distributing the crop on the underlying surface to form a windrow arrangement; and
fluffing the crop during the moving step, distributing step, or both.

* * * * *